United States Patent
Cutler et al.

(10) Patent No.: US 10,550,769 B2
(45) Date of Patent: Feb. 4, 2020

(54) FUEL MANIFOLD FITTING WITH INTEGRAL SUPPORT FOR A GAS TURBINE ENGINE

(71) Applicant: United Technologies Corporation, Hartford, CT (US)

(72) Inventors: Kari L. Cutler, Portland, CT (US); Joseph Szczapa, Suffield, CT (US)

(73) Assignee: United Technologies Corporation, Farmington, CT (US)

( * ) Notice: Subject to any disclaimer, the term of this patent is extended or adjusted under 35 U.S.C. 154(b) by 213 days.

(21) Appl. No.: 14/626,704

(22) Filed: Feb. 19, 2015

(65) Prior Publication Data

US 2015/0233297 A1    Aug. 20, 2015

Related U.S. Application Data

(60) Provisional application No. 61/941,860, filed on Feb. 19, 2014.

(51) Int. Cl.
*F02C 7/22* (2006.01)
*F02C 7/32* (2006.01)
*F23R 3/28* (2006.01)

(52) U.S. Cl.
CPC ............ *F02C 7/222* (2013.01); *F02C 7/32* (2013.01); *F05D 2230/30* (2013.01); *F05D 2230/60* (2013.01); *F23R 3/28* (2013.01); *Y10T 29/49229* (2015.01); *Y10T 137/6851* (2015.04)

(58) Field of Classification Search
CPC .. F02C 7/222; F02C 7/228; F02C 7/32; F05D 2260/30; F05D 2260/60; F23R 3/28; F23R 3/60; Y10T 137/6851; Y10T 137/6855; Y10T 137/6881

USPC ................................................ 248/74.4, 316.7
See application file for complete search history.

(56) References Cited

U.S. PATENT DOCUMENTS

| | | | | |
|---|---|---|---|---|
| 2,413,772 A | * | 1/1947 | Morehouse | F16L 3/1233 24/336 |
| 2,440,469 A | * | 4/1948 | Goddard | F16L 3/1233 248/68.1 |
| 2,470,309 A | * | 5/1949 | Hepp | F16L 3/1233 29/270 |
| 2,606,066 A | * | 8/1952 | Thompson | F02C 7/228 123/454 |
| 2,686,401 A | * | 8/1954 | Newcomb | F02C 7/222 60/739 |
| 2,690,648 A | * | 10/1954 | Hiscox | F02C 7/222 285/124.1 |
| 2,806,354 A | * | 9/1957 | Cook | F02C 7/228 60/39.37 |

(Continued)

FOREIGN PATENT DOCUMENTS

EP      2013133781 A     7/2013

OTHER PUBLICATIONS

EP search report for EP15155795.6 dated Jul. 20, 2015.

*Primary Examiner* — Mary E McManmon
*Assistant Examiner* — Jonathan J Waddy
(74) *Attorney, Agent, or Firm* — O'Shea Getz P.C.

(57) ABSTRACT

A manifold fitting for a gas turbine engine includes a manifold tee including a first manifold port, a second manifold port and a pigtail port. A support extends from the manifold tee. The support defines a support aperture along a mount axis. A support tab extends from the support.

18 Claims, 7 Drawing Sheets

(56) References Cited

U.S. PATENT DOCUMENTS

| | | | | |
|---|---|---|---|---|
| 3,460,788 A | * | 8/1969 | Goldman | F16L 3/1233 24/279 |
| 3,793,838 A | * | 2/1974 | Nash | F02C 7/222 60/739 |
| 4,201,046 A | * | 5/1980 | De Negris | F02C 7/222 60/39.37 |
| 5,031,407 A | | 7/1991 | Zaremba et al. | |
| 5,261,608 A | * | 11/1993 | Hatzis | F16L 41/086 123/469 |
| 5,271,588 A | * | 12/1993 | Doyle | F16L 3/237 248/68.1 |
| 5,273,249 A | * | 12/1993 | Peterson | F02C 7/20 248/550 |
| 5,369,952 A | * | 12/1994 | Walters | F02C 7/222 188/381 |
| 5,927,067 A | | 7/1999 | Hanloser et al. | |
| 6,038,852 A | | 3/2000 | Celi | |
| 6,210,043 B1 | * | 4/2001 | Detweiler | E01D 19/043 384/493 |
| 7,578,131 B2 | | 8/2009 | Muldoon et al. | |
| 7,647,775 B2 | | 1/2010 | Muldoon et al. | |
| 8,123,228 B2 | | 2/2012 | Muldoon et al. | |
| 9,036,324 B2 | * | 5/2015 | Marty | H02G 13/40 361/218 |
| 2003/0056578 A1 | | 3/2003 | Mitchell et al. | |
| 2004/0124282 A1 | | 7/2004 | Mansour et al. | |
| 2006/0035507 A1 | * | 2/2006 | Miles | F16L 3/1008 439/367 |
| 2007/0033940 A1 | * | 2/2007 | Duverneuil | F01D 25/28 60/743 |
| 2007/0068166 A1 | * | 3/2007 | Gautier | F02C 3/14 60/752 |
| 2008/0245074 A1 | * | 10/2008 | Oda | F02C 7/228 60/737 |
| 2012/0000844 A1 | | 1/2012 | Gibbons et al. | |
| 2014/0102112 A1 | | 4/2014 | Jewess et al. | |
| 2015/0176496 A1 | | 6/2015 | Zordan et al. | |
| 2016/0178090 A1 | * | 6/2016 | Schilling | F16L 3/237 248/68.1 |

* cited by examiner

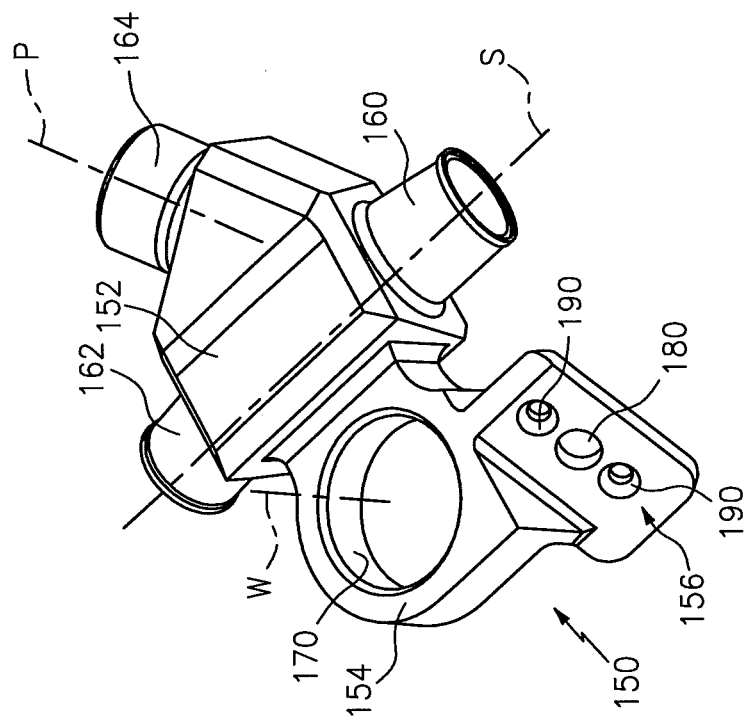
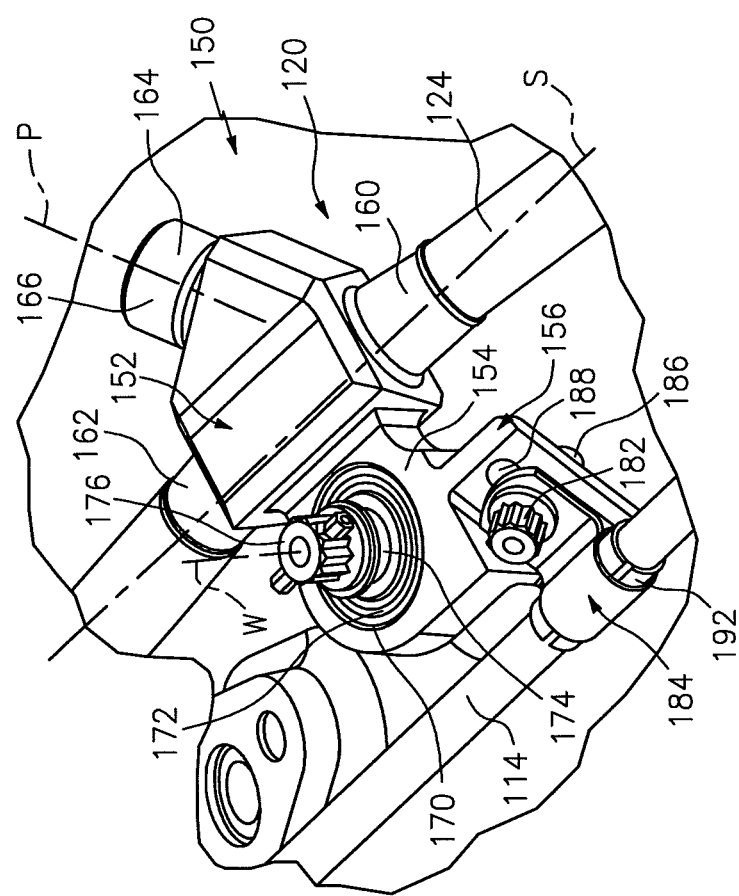
FIG. 6
FIG. 5

FUEL MANIFOLD FITTING WITH INTEGRAL SUPPORT FOR A GAS TURBINE ENGINE

CROSS-REFERENCE TO RELATED APPLICATION

This application claims priority to U.S. Patent Application Ser. No. 61/941,860 filed Feb. 19, 2014, which is hereby incorporated herein by reference in its entirety.

BACKGROUND

The present disclosure relates to a gas turbine engine and, more particularly, to a fuel manifold therefor.

Gas turbine engines, such as those that power modern commercial and military aircraft, include a compressor section to pressurize a supply of air, a combustor section to burn a hydrocarbon fuel in the presence of the pressurized air, and a turbine section to extract energy from the resultant combustion gases and generate thrust.

A fuel manifold system is mounted around a diffuser case of the combustor section and generally includes a multiple of circumferentially distributed fuel injectors that axially project into a combustion chamber to supply fuel thereto. The multiple of circumferentially distributed fuel injectors are connected to multiple fuel supply manifolds that deliver fuel to the fuel injectors though "pigtail" supply assemblies. There is typically one fuel supply manifold for each stage. Thus, each fuel injector may have multiple pigtail supply assembly connections that connect multiple fuel supply manifolds.

In one system, there are two fuel manifold rings, a primary fuel manifold and a secondary fuel manifold. The manifolds are mounted around the circumference of the diffuser case and need to accommodate thermal expansion of the diffuser case. Further, the fuel manifold system typically includes numerous valves, fuel injectors, fuel manifolds, fittings, conduits, pigtail supply assemblies, mounts and other components for both the primary manifold and the secondary manifold that may result in relatively complicated fuel manifold system. Yet, the fuel manifold system must necessarily be contained within an axial and radially constrained packaging space.

SUMMARY

A manifold fitting for a gas turbine engine, according to one disclosed non-limiting embodiment of the present disclosure, includes a manifold tee including a first manifold port, a second manifold port and a pigtail port. A support extends from the manifold tee and defines a support aperture along a mount axis. A support tab extends from the support.

In a further embodiment of the present disclosure, the first manifold port and the second manifold port are located along a common plane.

In a further embodiment of any of the foregoing embodiments of the present disclosure, the pigtail port is transverse to the common plane.

In a further embodiment of any of the foregoing embodiments of the present disclosure, the first manifold port and the second manifold port are located along a common circumferential axis.

In a further embodiment of any of the foregoing embodiments of the present disclosure, the pigtail port is transverse to the common circumferential axis.

In a further embodiment of any of the foregoing embodiments of the present disclosure, the support aperture is operable to support a bearing.

In a further embodiment of any of the foregoing embodiments of the present disclosure, the support tab supports a P-clamp.

In a further embodiment of any of the foregoing embodiments of the present disclosure, the P-clamp is attached to the support tab via a fastener.

In a further embodiment of any of the foregoing embodiments of the present disclosure, a nut plate riveted to the support tab retains the fastener.

In a further embodiment of any of the foregoing embodiments of the present disclosure, the support tab extends in a plane transverse to a plane that contains the support.

In a further embodiment of any of the foregoing embodiments of the present disclosure, the plane transverse to the plane that contains the support defines an angle of about forty-five (45) degrees.

A manifold fitting for a gas turbine engine, according to another disclosed non-limiting embodiment of the present disclosure, includes a manifold tee including a first manifold port, a second manifold port and a pigtail port. The first manifold port is operable to receive a first manifold tube of a secondary manifold. The second manifold port is operable to receive a second manifold tube of the secondary manifold. A support extends from the manifold tee. The support defines a support aperture along a mount axis. A support tab extends from the support. A P-clamp is attached to the support tab, where the P-clamp is operable to retain a manifold tube of a primary manifold.

In a further embodiment of any of the foregoing embodiments of the present disclosure, the pigtail port is operable to receive a pigtail assembly.

In a further embodiment of any of the foregoing embodiments of the present disclosure, a nut plate riveted to the support tab retains the P-clamp via a fastener.

In a further embodiment of any of the foregoing embodiments of the present disclosure, the support tab extends in a plane transverse to a plane that contains the support.

In a further embodiment of any of the foregoing embodiments of the present disclosure, the plane transverse to the plane that contains the support defines an angle of about forty-five (45) degrees.

In a further embodiment of any of the foregoing embodiments of the present disclosure, the support aperture is operable to support a bearing.

A method of mounting a fuel supply manifold assembly for a gas turbine engine, according to another disclosed non-limiting embodiment of the present disclosure, includes mounting a first manifold tube of a secondary manifold to a first manifold port of a manifold body; mounting a second manifold tube of the secondary manifold to a second manifold port of the manifold body; and mounting a manifold tube of a primary manifold with a P-clamp attached to a support tab of the manifold body.

In a further embodiment of any of the foregoing embodiments of the present disclosure, the support tab is angled to radially and axially displace the manifold tube of the primary manifold with respect to the secondary manifold.

In a further embodiment of any of the foregoing embodiments of the present disclosure, the method includes supporting the manifold body on a post that extends from a diffuser case through a bearing assembly.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment(s). The drawings that accompany the detailed description can be briefly described as follows:

FIG. 5 is an expanded perspective view of a manifold fitting for multiple fuel supply manifolds according to one disclosed non-limiting embodiment;

FIG. 6 is an expanded perspective view of the body of the manifold fitting of FIG. 5;

DETAILED DESCRIPTION

Figure 1:
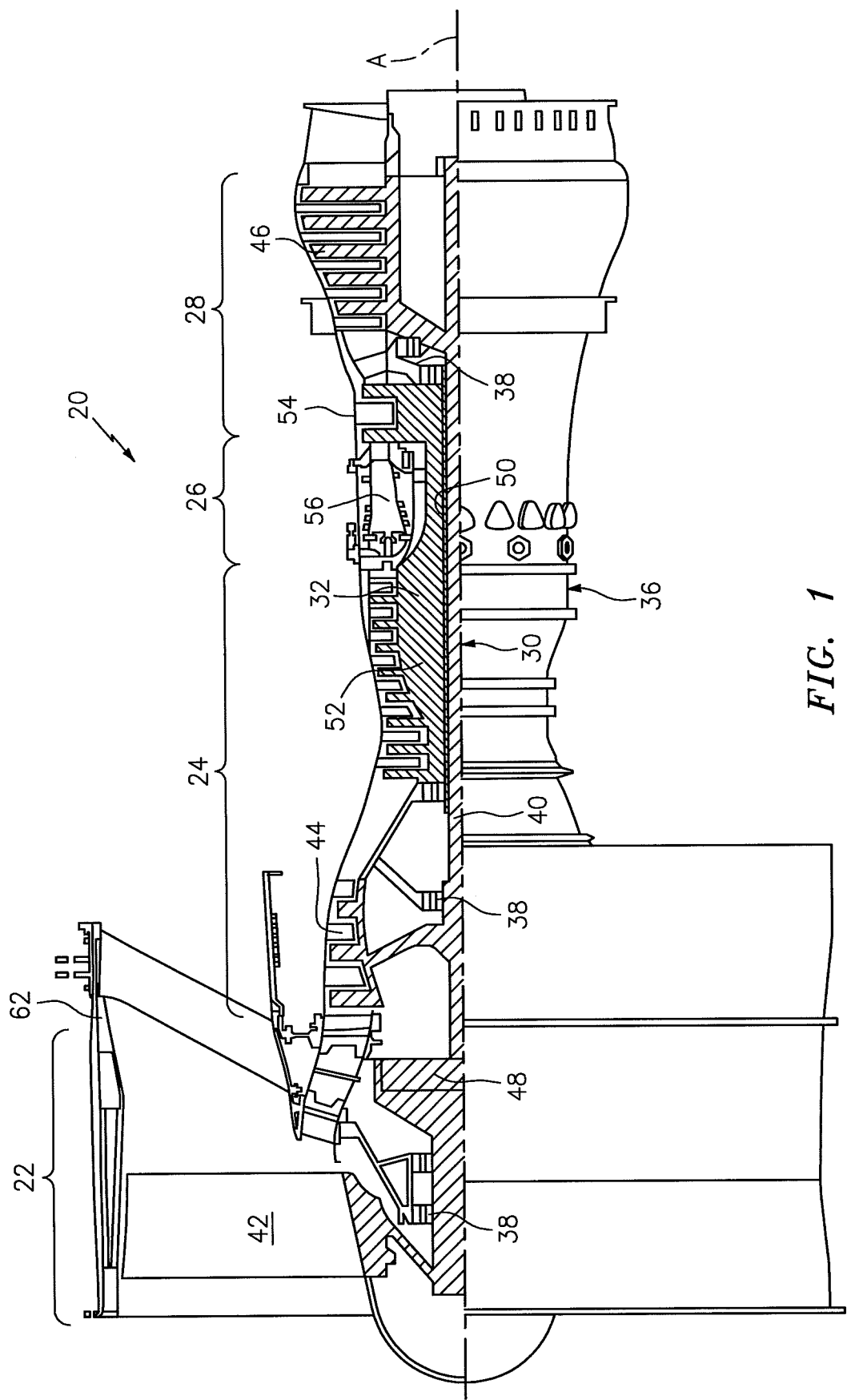
FIG. 1 is a schematic cross-section of a gas turbine engine.

FIG. 1 schematically illustrates a gas turbine engine 20. The gas turbine engine 20 is disclosed herein as a two-spool turbofan that generally includes a fan section 22, a compressor section 24, a combustor section 26 and a turbine section 28. Alternative engines might include an augmentor section (not shown) among other systems or features. The fan section 22 drives air into the compressor section 24 and along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines, for example, but not limited to, a three-spool (plus fan) engine.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A that is collinear with their longitudinal axes.

Core airflow is compressed by the LPC 44 then the HPC 52, mixed with the fuel and burned in the combustor 56, then expanded through the HPT 54 and LPT 46. The LPT 46 and the HPT 54 rotationally drive the respective low spool 30 and high spool 32 in response to the expansion.

Figure 2:
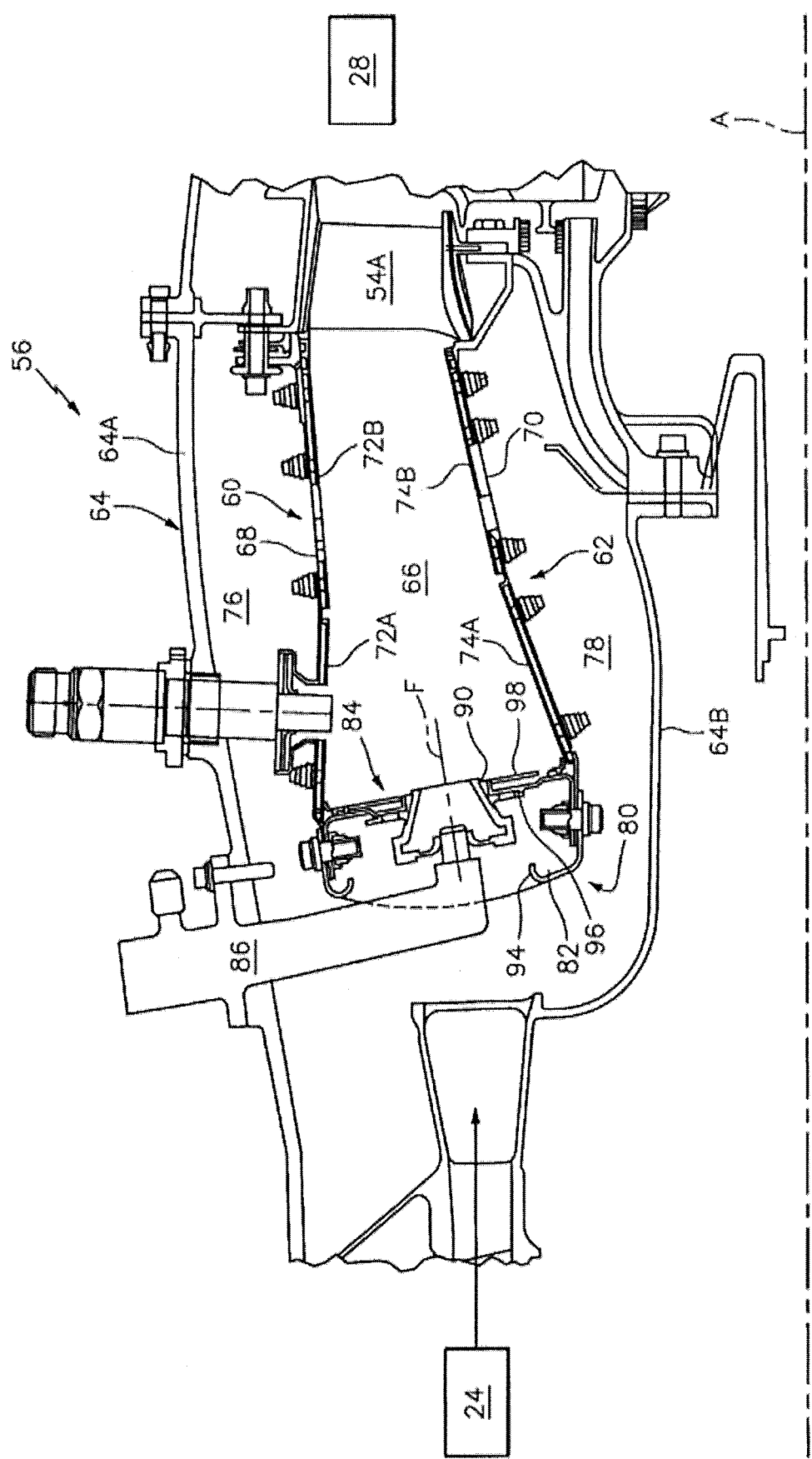
FIG. 2 is a partial longitudinal schematic sectional view of a combustor section according to one non-limiting embodiment that may be used with the gas turbine engine shown in FIG. 1.

With reference to FIG. 2, the combustor 56 generally includes an outer liner 60, an inner liner 62 and a diffuser case module 64. The outer liner 60 and the inner liner 62 are spaced apart such that a combustion chamber 66 is defined therebetween. The combustion chamber 66 is generally annular in shape. The outer liner 60 is spaced radially inward from an outer diffuser case 64A of the diffuser case module 64 to define an annular outer plenum 76. The inner liner 62 is spaced radially outward from an inner diffuser case 64B of the diffuser case module 64 to define an annular inner plenum 78. It should be understood that although a particular combustor is illustrated, other combustor types with various combustor liner arrangements will also benefit herefrom.

The liners 60, 62 contain the combustion products for direction toward the turbine section 28. Each liner 60, 62 generally includes a respective support shell 68, 70 which supports a multiple of heat shields 72A, 72B, 74A, 74B which are attached to a hot side of the respective support shell 68, 70 with fasteners such as studs and nuts.

The combustor 56 also includes a forward assembly 80 immediately downstream of the compressor section 24 to guide compressed airflow C therefrom. The forward assembly 80 generally includes an annular hood 82, a bulkhead assembly 84 and a multiple of swirlers 90 (one shown).

The annular hood 82 extends radially between, and in this disclosed non-limiting embodiment, is secured to, the forwardmost ends of the liners 60, 62. The multiple of circumferentially distributed hood ports 94 accommodate a respective multiple of fuel injectors 86 as well as direct compressed air into the forward end of the combustion chamber 66 through the associated swirler 90. Each fuel injector 86 may be secured to the diffuser case module 64 to project through one of the hood ports 94 and the respective swirler 90. It should be appreciated that various architectures of the forward assembly 80 will also benefit herefrom.

Each swirler 90 in this disclosed non-limiting embodiment is circumferentially aligned with its respective hood port 94 to project through the bulkhead assembly 84. The bulkhead assembly 84 includes a bulkhead support shell 96 secured to the liners 60, 62, and a multiple of circumferentially distributed bulkhead heat shields 98 secured to the bulkhead support shell 96 around each swirler 90.

The forward assembly 80 and liners 60, 62 introduce core combustion air into the forward end of the combustion chamber 66 while the remainder enters the annular outer plenum 76 and the annular inner plenum 78. The multiple of fuel injectors 86 and swirlers 90 facilitate the generation of a blended fuel-air mixture that supports combustion in the combustion chamber 66.

Opposite the forward assembly 80, the outer and inner support shells 68, 70 interface with a first row of Nozzle Guide Vanes (NGVs) 54A of the HPT 54 in this disclosed non-limiting embodiment. The NGVs 54A are located immediately downstream of the combustor 56 as the first static vane structure upstream of a first turbine rotor in the turbine section 28. The NGVs 54A are static engine components which direct core airflow combustion gases onto the turbine blades of the first turbine rotor in the turbine section 28 to facilitate the conversion of pressure energy into kinetic energy. The combustion gases are also accelerated by the NGVs 54A because of their convergent shape and typically provide a "spin" or a "swirl" in the direction of turbine rotor rotation. The turbine rotor blades absorb this energy to drive the turbine rotor.

Figure 3:
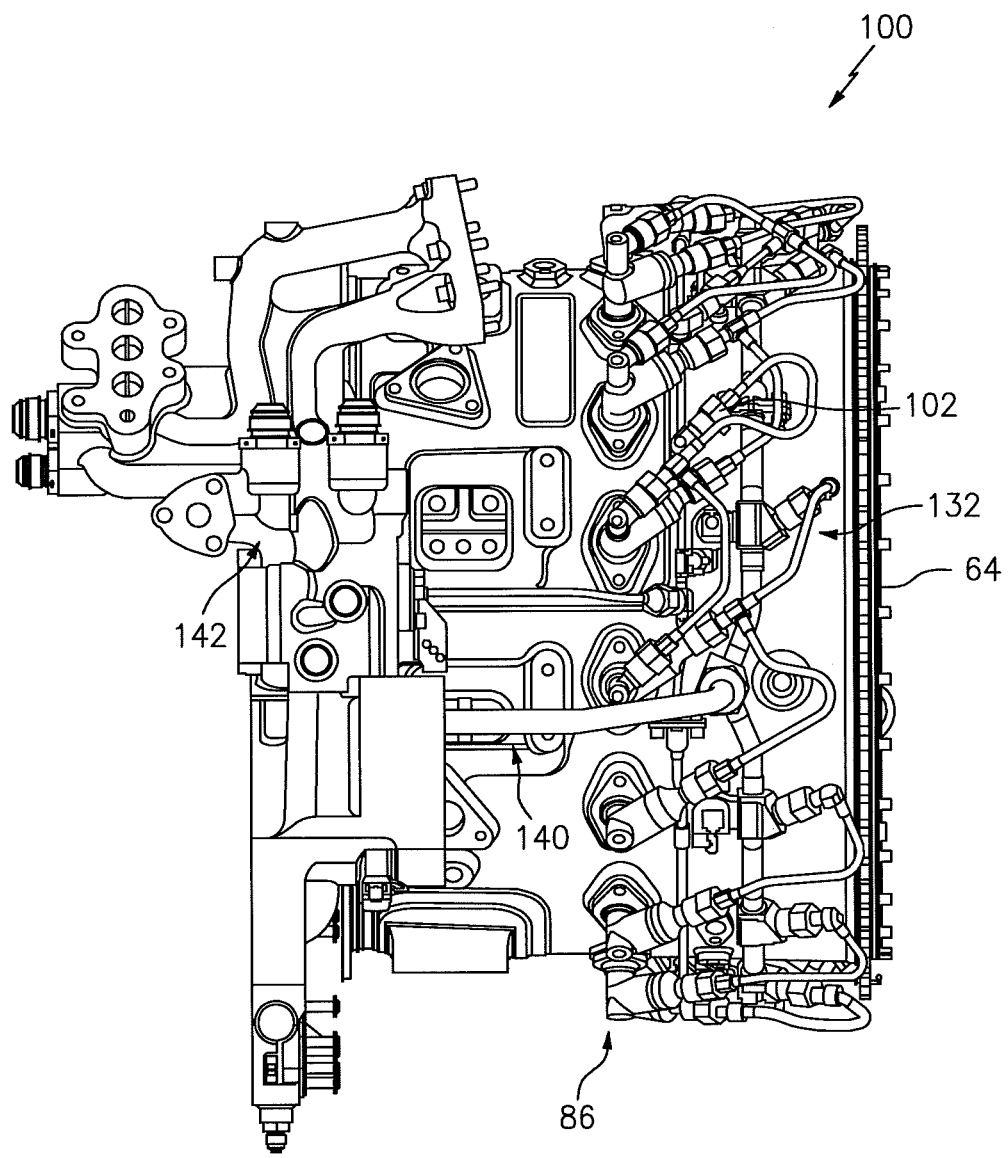
FIG. 3 is a perspective view of a fuel supply manifold assembly around a diffuser case module.
Figure 4:
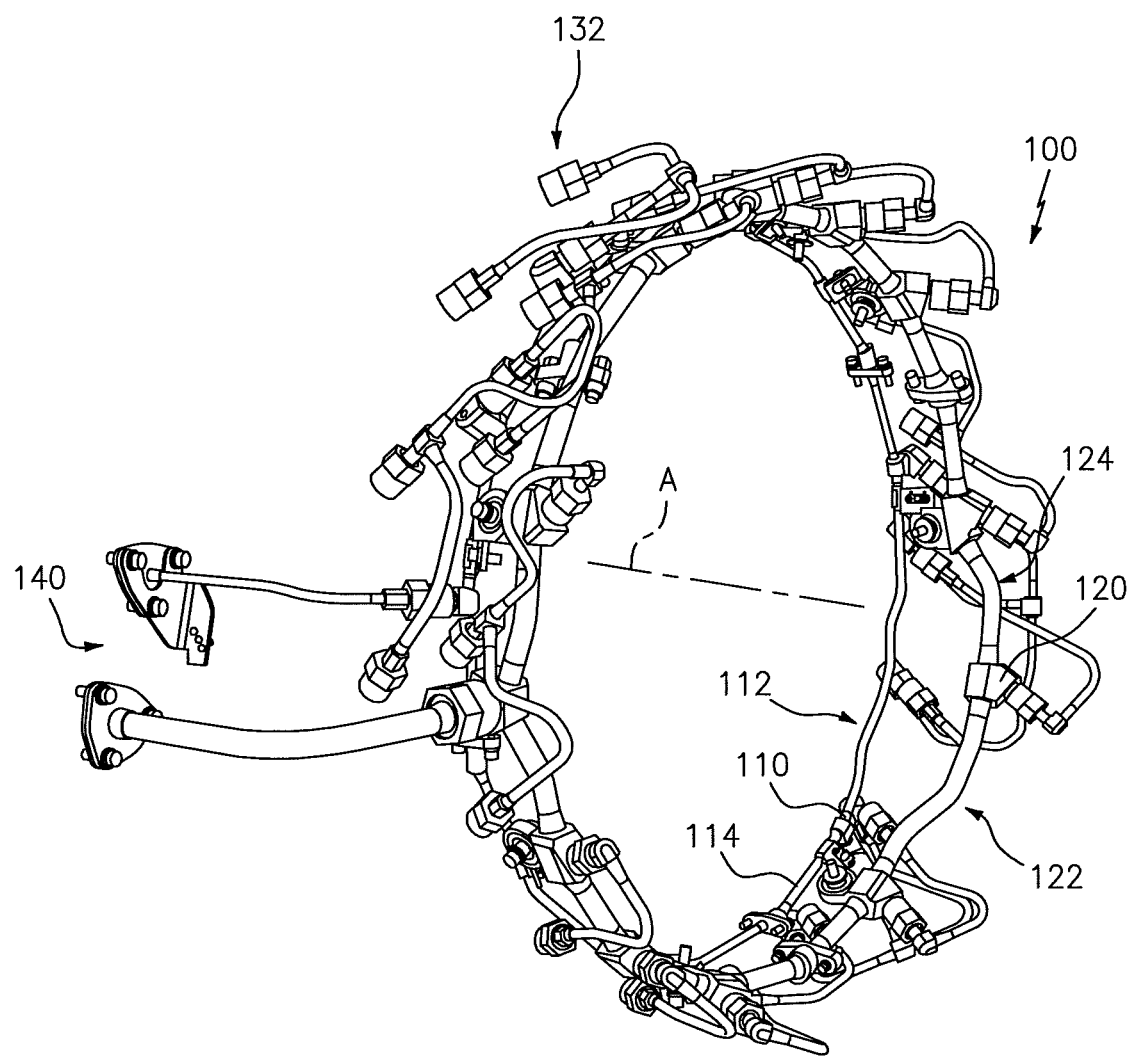
FIG. 4 is a perspective view of the fuel supply manifold assembly of FIG. 4.

With reference to FIG. 3, a fuel supply manifold assembly 100 generally includes at least one fuel supply manifold 102 such as a primary and secondary manifold, generally arranged circumferentially around the diffuser case module 64 to communicate fuel to the multiple of fuel injectors 86. It should be appreciated that various fuel injector systems and geometries will benefit herefrom. Referring to FIG. 4, in one example, the primary manifold is split into four tube section, while the secondary manifold is split into three roughly even tube sections. A fuel manifold feed subassembly 140 communicates fuel into the fuel supply manifold assembly 100 from, for example, a fuel oil manifold 142 (see FIG. 3).

The fuel supply manifold assembly 100 includes a multiple of primary manifold fittings 110 and a multiple of secondary manifold fittings 120. The primary manifold fittings 110 connect together a primary fuel manifold 112 of a multiple of primary fuel tubes 114. The multiple of secondary manifold fittings 120 connect a secondary fuel manifold 122 of a multiple of secondary fuel tubes 124. Each of the multiple of primary fuel tubes 114 may, for example be about 0.25 inches (7.25 mm) in diameter while each of the multiple of secondary fuel tubes 124 may be about 0.5 inches (12.5 mm) in diameter. Each of the multiple of primary manifold fittings 110 and the multiple of secondary manifold fittings 120 communicate fuel from the respective primary fuel manifold 112 and the secondary fuel manifold 122 to the fuel injectors 86 via a respective associated pigtail assembly 132.

With reference to FIG. 5, each of the multiple of secondary manifold fittings 120 includes a manifold body 150 with a manifold tee 152, a support 154 and a support tab 156 (also shown in FIG. 6). It should be appreciated that although particular sections of each secondary manifold fitting 120 are separately defined but integrally formed as the body 150, each or any segment separately defined for descriptive purposes may be otherwise combined or segregated via assembled and/or integrated hardware.

In this disclosed non-limiting embodiment, eight (8) secondary manifold fittings 120 are provided around the diffuser case module 64 to support the primary fuel manifold 112 and the secondary fuel manifold 122. Furthermore, although each of the multiple of secondary manifold fittings 120 are operable as a support for both manifolds 112, 122 as the secondary manifold 122 is the larger flow manifold, it should be appreciated that other such manifold fittings will also benefit herefrom.

The manifold tee 152 includes a first manifold port 160, a second manifold port 162 and a pigtail port 164. The first manifold port 160 and the second manifold port 162 defines a common circumferential plane S while the pigtail port 164 defines an axis P transverse to plane S. One of the multiple of secondary fuel tubes 124 are respectively connected to the manifold ports 160, 162 through, for example, a weld operation. The pigtail port 164 includes a threaded portion 166 to removably connect to the pigtail assembly 132.

Figure 7:
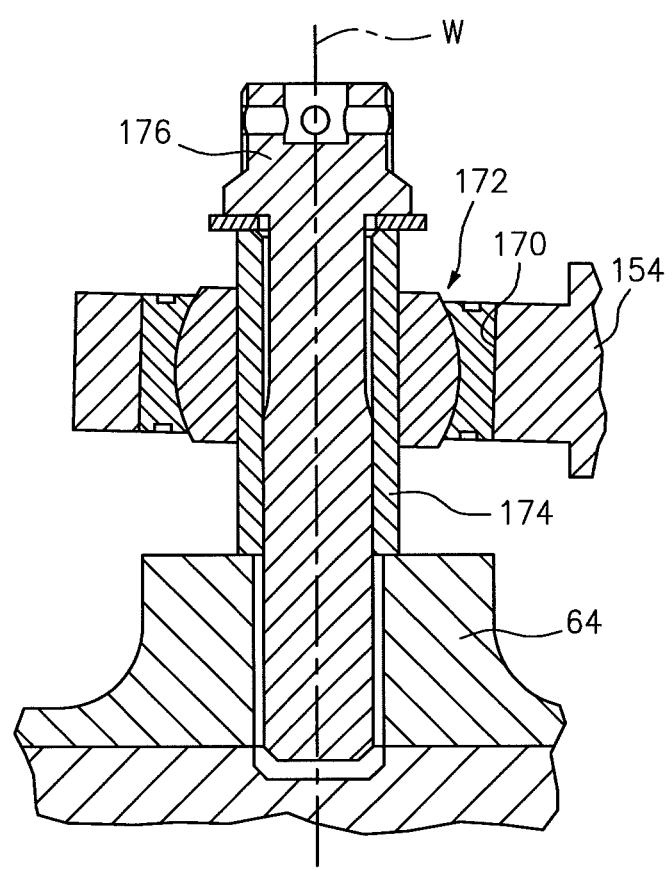
FIG. 7 is a sectional view of support section of the manifold fitting body.

The support 154 extends from the manifold tee 152 opposite the pigtail port 164 and includes an aperture 170 to receive bearing assembly 172 along a mount axis W. The bearing assembly 172 is supported upon a post 174 and retained thereon by a fastener 176 (also shown in FIG. 7). The post 174 is mounted to the diffuser case 64 such that the bearing assembly 172 allows the secondary manifold fittings 120 to float with respect to the diffuser case 64 to accommodate, for example, thermal expansion of the diffuser case 64.

The support tab 156 extends from the support 154 in a direction of plane S and is defined in a plane transverse to a plane that contains the support 154. In one disclosed non-limiting embodiment, the plane of the support tab 156 defines an angle alpha of about forty-five (45) degrees with respect to the plane that contain the plane of support 154. The support tab 156 includes a central aperture 180 (see FIG. 6) to receive a fastener 182 and associated P-clamp 184. The fastener 182 may be received within a nut plate 186 that is riveted to the backside of the support tab 156 via rivets 188 through apertures 190. The nut plate 186 reduces separable individual components to thereby minimize FOD potential. It should be appreciated that the nut-plate 186 has a locking feature for secondary retention to eliminate the need for safety cable.

Figure 8:
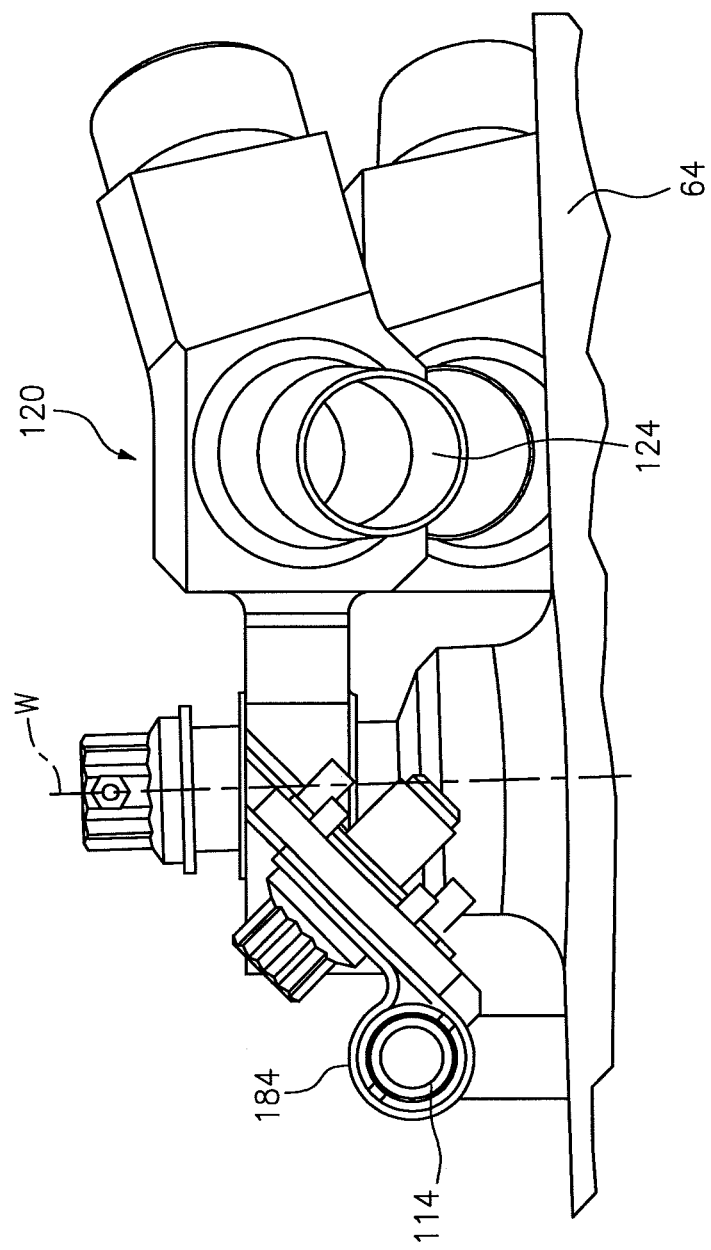
FIG. 8 is an expanded side perspective view of the manifold fitting assembly of FIG. 5.

The P-clamp 184 is arranged to receive and retain the primary fuel tube 114. In this disclosed non-limiting embodiment, a wear sleeve 192 surrounds the primary fuel tube 114 and is received within the P-clamp 184. The P-clamp 184 thereby obtains structural support from the support tab 156 as it is "fully backed" by the length thereof to support the primary fuel tube 114. In this disclosed non-limiting embodiment, the multiple of primary fuel tubes 114 of the primary fuel manifold 112 are retained co-annularly with the multiple of secondary fuel tubes 124 of the secondary fuel manifold 122, radially inward and axially offset thereof with respect to the diffuser case 64 (FIG. 8).

The primary fuel manifold 112 and the secondary fuel manifold 122 are thereby affixed to one another for support. This secondary manifold fitting 120 configuration allows the primary manifold to float radially in and out along with the secondary manifold to allow the diffuser case to expand radially with respect thereto. Although depicted as a primary and secondary, it should be appreciated that any configuration of multiple parallel manifolds may be supported by one array of support locations.

It should be understood that relative positional terms such as "forward," "aft," "upper," "lower," "above," "below," and the like are with reference to the normal operational attitude and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A system comprising:
a manifold fitting that includes:
a manifold tee including a first manifold port, a second manifold port and a pigtail port;
a support that extends from the manifold tee, wherein the support defines a support aperture along a mount axis;
a support tab that extends from the support; and
a bearing supported in the support aperture;
a post that is mounted to a diffuser case through the bearing such that the manifold fitting floats radially with respect to the diffuser case;
wherein the support tab supports a P-clamp.

2. The system as recited in claim 1, wherein the first manifold port and the second manifold port are located along a common plane.

3. The system as recited in claim 2, wherein the pigtail port is transverse to the common plane.

4. The system as recited in claim 1, wherein the first manifold port and the second manifold port are located along a common axis.

5. The system as recited in claim 4, wherein the pigtail port is transverse to the common axis.

6. The system as recited in claim 1, wherein the P-clamp is attached to the support tab via a fastener.

7. The system as recited in claim 6, wherein a nut plate riveted to the support tab retains the fastener.

8. The system as recited in claim 1, wherein the support tab extends in a plane transverse to a plane that contains the support.

9. The system as recited in claim 8, wherein the plane transverse to the plane that contains the support defines an angle of about forty-five (45) degrees.

10. A system comprising:
a manifold fitting that includes:
a manifold tee including a first manifold port, a second manifold port and a pigtail port, the first manifold port operable to receive a first manifold tube of a secondary manifold, and the second manifold port operable to receive a second manifold tube of the secondary manifold;
a support that extends from the manifold tee, wherein the support defines a support aperture along a mount axis;
a support tab that extends from the support;
a P-clamp attached to the support tab, wherein the P-clamp is operable to retain a manifold tube of a primary manifold; and
a bearing supported in the support aperture;
a post that is mounted to a diffuser case through the bearing such that the manifold fitting floats radially with respect to the diffuser case.

11. The system as recited in claim 10, wherein the pigtail port is operable to receive a pigtail assembly.

12. The system as recited in claim 10, wherein a nut plate riveted to the support tab retains the P-clamp via a fastener.

13. The system as recited in claim 10, wherein the support tab extends in a plane transverse to a plane that contains the support.

14. The system as recited in claim 13, wherein the plane transverse to the plane that contains the support defines an angle of about forty-five (45) degrees.

15. The system as recited in claim 10, wherein the manifold tee is operable to communicate fuel from the first manifold port to the second manifold port, and wherein the manifold tee is operable to communicate fuel from the first manifold port to the pigtail port.

16. A method of mounting a fuel supply manifold assembly for a gas turbine engine, the method comprising:
mounting a first manifold tube of a secondary manifold to a first manifold port of a manifold body;
mounting a second manifold tube of the secondary manifold to a second manifold port of the manifold body;
mounting a manifold tube of a primary manifold with a P-clamp attached to a support tab of the manifold body;
supporting the manifold body on a post that extends from a diffuser case through a bearing assembly;
retaining the bearing assembly on the post by a fastener; and
mounting the post to the diffuser case such that the secondary manifold floats radially with respect to the diffuser case.

17. The method as recited in claim 16, wherein the support tab is angled to radially and axially displace the manifold tube of the primary manifold with respect to the secondary manifold.

18. The method of claim 16, wherein the primary manifold floats radially with respect to the diffuser case.

* * * * *